United States Patent
Grifols Roura

(10) Patent No.: US 10,754,174 B2
(45) Date of Patent: Aug. 25, 2020

(54) DEVICE FOR ATTACHING GLASSES TO GARMENTS

(71) Applicant: Raimon Grifols Roura, Barcelona (ES)

(72) Inventor: Raimon Grifols Roura, Barcelona (ES)

( * ) Notice: Subject to any disclaimer, the term of this patent is extended or adjusted under 35 U.S.C. 154(b) by 0 days.

(21) Appl. No.: 16/075,903

(22) PCT Filed: Jun. 1, 2017

(86) PCT No.: PCT/ES2017/070392
§ 371 (c)(1),
(2) Date: Aug. 6, 2018

(87) PCT Pub. No.: WO2018/104567
PCT Pub. Date: Jun. 14, 2018

(65) Prior Publication Data
US 2019/0079313 A1    Mar. 14, 2019

(30) Foreign Application Priority Data
Dec. 7, 2016  (ES) .................................. 201631560

(51) Int. Cl.
| | | |
|---|---|---|
| *G02C 3/04* | (2006.01) | |
| *A45F 5/02* | (2006.01) | |
| *B43K 25/02* | (2006.01) | |
| *A45F 5/00* | (2006.01) | |
| *G02C 5/00* | (2006.01) | |

(52) U.S. Cl.
CPC .................. *G02C 3/04* (2013.01); *A45F 5/00* (2013.01); *A45F 5/02* (2013.01); *B43K 25/02* (2013.01); *A45F 2200/0541* (2013.01); *G02C 5/00* (2013.01)

(58) Field of Classification Search
CPC . G02C 3/04; G02C 5/00; G02C 11/00; B43K 25/02; B43K 23/001; A45F 5/02; A45F 5/00; A45F 2200/0541; Y10T 24/1371
See application file for complete search history.

(56) References Cited

U.S. PATENT DOCUMENTS

| | | | | |
|---|---|---|---|---|
| D10,872 S | * | 10/1878 | Gessner | ........................ D19/121 |
| 1,779,015 A | * | 10/1930 | Schmitt | ..................... G02C 3/04 |
| | | | | 351/112 |
| 1,898,059 A | * | 2/1933 | McDonald | ............... G02C 3/04 |
| | | | | 24/3.5 |

(Continued)

FOREIGN PATENT DOCUMENTS

| | | |
|---|---|---|
| CN | 201108090 | 9/2008 |
| EP | 1 367 530 A1 | 12/2003 |

(Continued)

OTHER PUBLICATIONS

International Search Report and Written Opinion of the International Searching Authority for International Patent Application No. PCT/ES2017/070392 dated Nov. 29, 2017, 12 pages.

(Continued)

*Primary Examiner* — Robert Sandy
*Assistant Examiner* — Rowland Do
(74) *Attorney, Agent, or Firm* — Merchant & Gould P.C.

(57) ABSTRACT

A device is for attaching glasses to garments. The device includes an elongate element into which are placed fasteners for fastening to garments and a device for attaching a glasses temple.

8 Claims, 8 Drawing Sheets

(56) References Cited

U.S. PATENT DOCUMENTS

| | | | | |
|---|---|---|---|---|
| 2,704,302 | A * | 3/1955 | Budd | F16L 3/13 |
| | | | | 174/175 |
| D182,239 | S * | 3/1958 | Hartline | D19/121 |
| 2,832,114 | A * | 4/1958 | Mead | G02C 11/00 |
| | | | | 24/10 R |
| 3,266,111 | A * | 8/1966 | Abel | B43K 23/001 |
| | | | | 24/3.3 |
| 3,769,663 | A * | 11/1973 | Perl | G02C 11/04 |
| | | | | 224/181 |
| 3,883,236 | A | 5/1975 | Zipper | |
| 4,852,221 | A * | 8/1989 | Antonucci | B43K 23/001 |
| | | | | 24/10 R |
| 4,894,887 | A | 1/1990 | Ward, II | |
| 4,903,375 | A | 2/1990 | DiFranco | |
| 5,235,727 | A * | 8/1993 | McCloskey | G02C 3/04 |
| | | | | 24/3.3 |
| 5,278,591 | A | 1/1994 | Trotter | |
| 5,414,906 | A * | 5/1995 | Kren | G02C 3/04 |
| | | | | 24/11 S |
| 5,895,018 | A | 4/1999 | Rielo | |
| 5,941,487 | A * | 8/1999 | Keely | B60R 7/082 |
| | | | | 248/231.51 |
| 5,983,459 | A | 11/1999 | Goldenberg | |
| 6,120,146 | A * | 9/2000 | Harris | G02C 11/00 |
| | | | | 351/121 |
| 6,210,003 | B1 | 4/2001 | Chan | |
| 6,343,859 | B1 | 2/2002 | McCormick | |
| D502,505 | S * | 3/2005 | Goldberg | D19/121 |
| 7,918,554 | B2 * | 4/2011 | Laventure | B43K 23/001 |
| | | | | 351/111 |
| D650,827 | S * | 12/2011 | Northington | D16/330 |
| D710,097 | S * | 8/2014 | Forbus | D3/266 |
| D732,112 | S | 6/2015 | Murphy, Jr. | |
| 9,316,849 | B2 * | 4/2016 | Wang | G02B 27/0172 |
| 9,791,102 | B2 * | 10/2017 | Moreau | A44C 11/005 |
| 10,185,163 | B2 * | 1/2019 | Blum | G02C 11/10 |
| 2003/0088947 | A1 | 5/2003 | Kushner | |
| 2003/0192786 | A1 | 10/2003 | Chao | |
| 2004/0200040 | A1 | 10/2004 | Frassanito | |
| 2005/0128430 | A1 | 6/2005 | Uren | |
| 2005/0241115 | A1 | 11/2005 | Zoullas | |
| 2006/0152671 | A1 * | 7/2006 | Risso | A42B 1/247 |
| | | | | 351/155 |
| 2007/0013864 | A1 * | 1/2007 | Dietz | G02C 11/00 |
| | | | | 351/155 |
| 2007/0095991 | A1 * | 5/2007 | Fall | A45F 5/02 |
| | | | | 248/229.26 |
| 2014/0029183 | A1 * | 1/2014 | Ashcraft | G06F 1/26 |
| | | | | 361/679.4 |
| 2015/0338684 | A1 * | 11/2015 | Steiner | G02C 11/00 |
| | | | | 351/112 |
| 2015/0343831 | A1 * | 12/2015 | Ceruzzi | B43K 23/001 |
| | | | | 24/304 |
| 2016/0259183 | A1 | 9/2016 | Rayner | |
| 2018/0368546 | A1 * | 12/2018 | Ceccarelli | G02C 11/00 |

FOREIGN PATENT DOCUMENTS

| | | |
|---|---|---|
| JP | H06-76926 U | 10/1994 |
| JP | H07-32632 U | 6/1995 |
| JP | H10-23906 A | 1/1998 |
| JP | 2002-522135 A | 7/2002 |
| JP | 2015-148705 A | 8/2015 |
| TW | 201140143 A | 11/2011 |
| WO | 94/16594 A1 | 8/1994 |

OTHER PUBLICATIONS

Australian Examination Report No. 1 for Australian Patent Application No. 2017373902 dated Oct. 2, 2018, 4 pages.

* cited by examiner

DEVICE FOR ATTACHING GLASSES TO GARMENTS

This application is a National Stage Application of PCT/ES2017/070392, filed 1 Jun. 2017, which claims benefit of Application Serial No. P201631560, filed 7 Dec. 2016 in Spain and which applications are incorporated herein by reference. To the extent appropriate, a claim of priority is made to each of the above-disclosed applications.

BACKGROUND OF THE INVENTION

The present invention belongs to the sector of devices intended for attaching and transporting usable items. In particular, it relates to a device for attaching glasses that allows them to be fastened to a garment when said glasses are not in use.

Attaching glasses to garments entails inconvenience for the user. Glasses are usually hung from a pocket or the neckline of a shirt/blouse by inserting one of their temples into said pocket or said neckline. However, this type of attachment is very insecure and requires the presence of a shirt neckline or pocket of suitable size and arrangement.

This problem has led to the development of various devices that adhere to one of the temples of the glasses and which, by means of a clip-type element, allow them to be attached to any garment. Known devices, however, have many drawbacks. On the one hand, some of these devices (such as those described in US patents US2005128430A1 and U.S. Pat. No. 6,343,859B1) are manufactured directly within the frame, which does not allow them to be used with different glasses. What is more, these devices are present on the temple of the glasses even when the latter are in use, with the obvious problems of convenience and aesthetic appearance that this entails.

Alternatively, there are other devices that are attached non-permanently to the temple of the glasses, either by means of a bespoke rigid element, as in U.S. Pat. No. 3,883,236, or by means of elastic bands, as in U.S. Pat. No. 4,903,375A. Even though these devices have the advantage that they can be used with different glasses frames, they still involve an aesthetic and convenience problem since they are designed to be held together with the temple of the glasses even when the latter are in use, since their hooking to and unhooking from the latter is a complicated process that does not allow it to be performed easily and quickly.

SUMMARY OF THE INVENTION

The inventor of the present invention has managed to eliminate the insecurity of attaching glasses to garments by means of an ingenious device. Said device has several advantages over the prior art since it does not involve any element being attached permanently to the glasses, it allows rapid hooking and unhooking thereof and can be used with several frames. This latter feature is of particular interest since it allows the user to alternate easily between using prescription glasses and sunglasses. Furthermore, said attachment device can have functionalities in addition to that of attaching glasses.

In particular, the present invention discloses a device for attaching glasses, characterised in that it comprises an elongate element into which are placed means for fastening to garments and means for attaching a glasses temple.

Said device is kept attached to the clothing by the fastening means and allows the glasses to be easily attached by hooking one of the temples of said glasses to the fastening means located on said device.

When the user wants to use the glasses, they are easily unhooked from the device without the need to separate said device from the clothing, the glasses being freed from said device.

Optionally, the elongate element can have additional functionalities when it is not being used for attaching glasses; for example, it can be a ballpoint pen, mechanical pencil, stylus for mobile devices, flashlight, small tool or laser pointer, among other things.

Preferably, the means of the device for fastening it to clothing is a clip-type clamp made of plastics or metal.

In a preferred embodiment of the present invention, the means for attaching the device to the glasses are at least two rings configured so that the glasses temple can be inserted through them. In another embodiment of the invention, said attachment means are at least two clamps configured so that the glasses temple can be inserted by pressure. Said clamps allow the temple to be fitted easily to the device irrespective of the shape and size of the latter.

Preferably, the means for attaching the temple are detachable and are fastened by pressure to the elongate element through at least two holes located on the surface of said elongate element.

BRIEF DESCRIPTION OF THE DRAWINGS

For a better understanding of the present invention, various exemplary embodiments are described below based on explanatory but non-restrictive drawings, in which.

DETAILED DESCRIPTION OF THE PREFERRED EMBODIMENT

Figure 1:
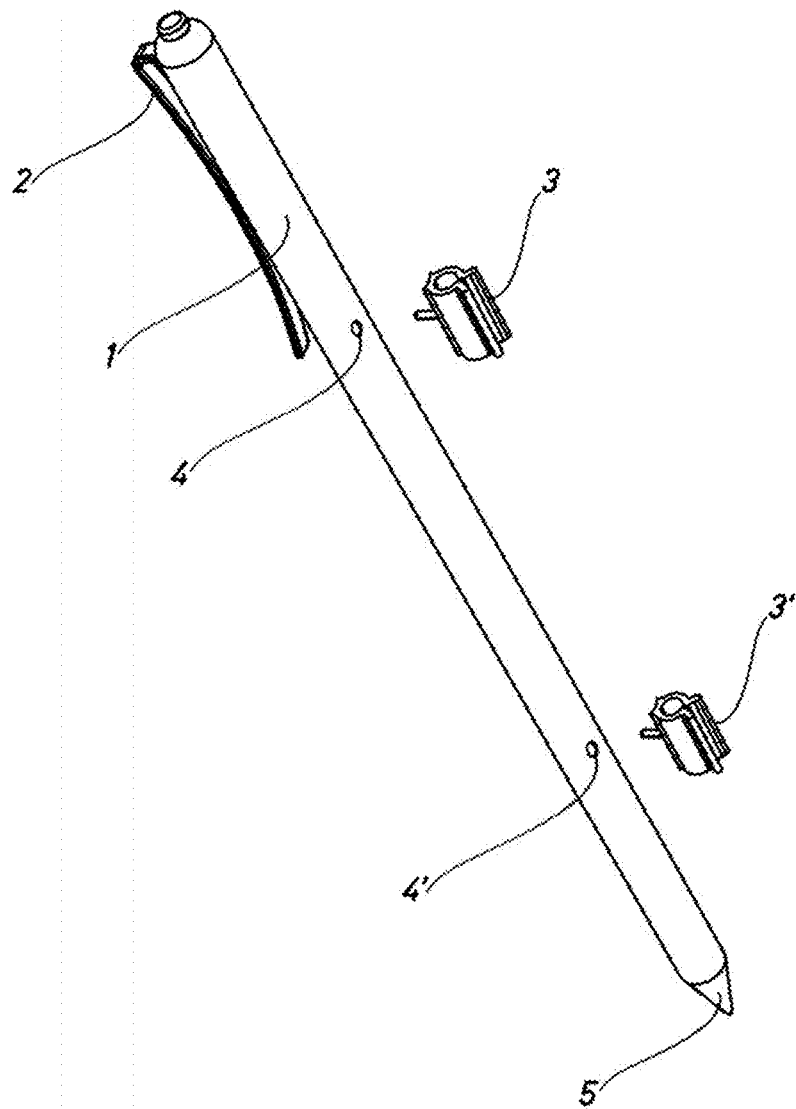
FIG. 1 shows a perspective view of a possible embodiment of the device for attaching glasses of the present invention, in which the means for attaching the temple have not been inserted into the elongate element.

As can be seen in the embodiment of the present invention shown in FIG. 1, the device for attaching glasses to garments has an elongate element -1-, means -2- for fastening to garments and means -3-, -3'- for attaching a glasses temple.

The elongate element has two holes -4-, -4'- of a suitable arrangement and size for fastening the glasses attachment means -3-. -3'- by pressure.

Similarly, the elongate element contains a tip -5- that can give the device for attaching glasses additional functionalities; for example, it can be a ballpoint pen, mechanical pencil, stylus for mobile devices, flashlight, small tool or laser pointer, among other things.

Figure 2:
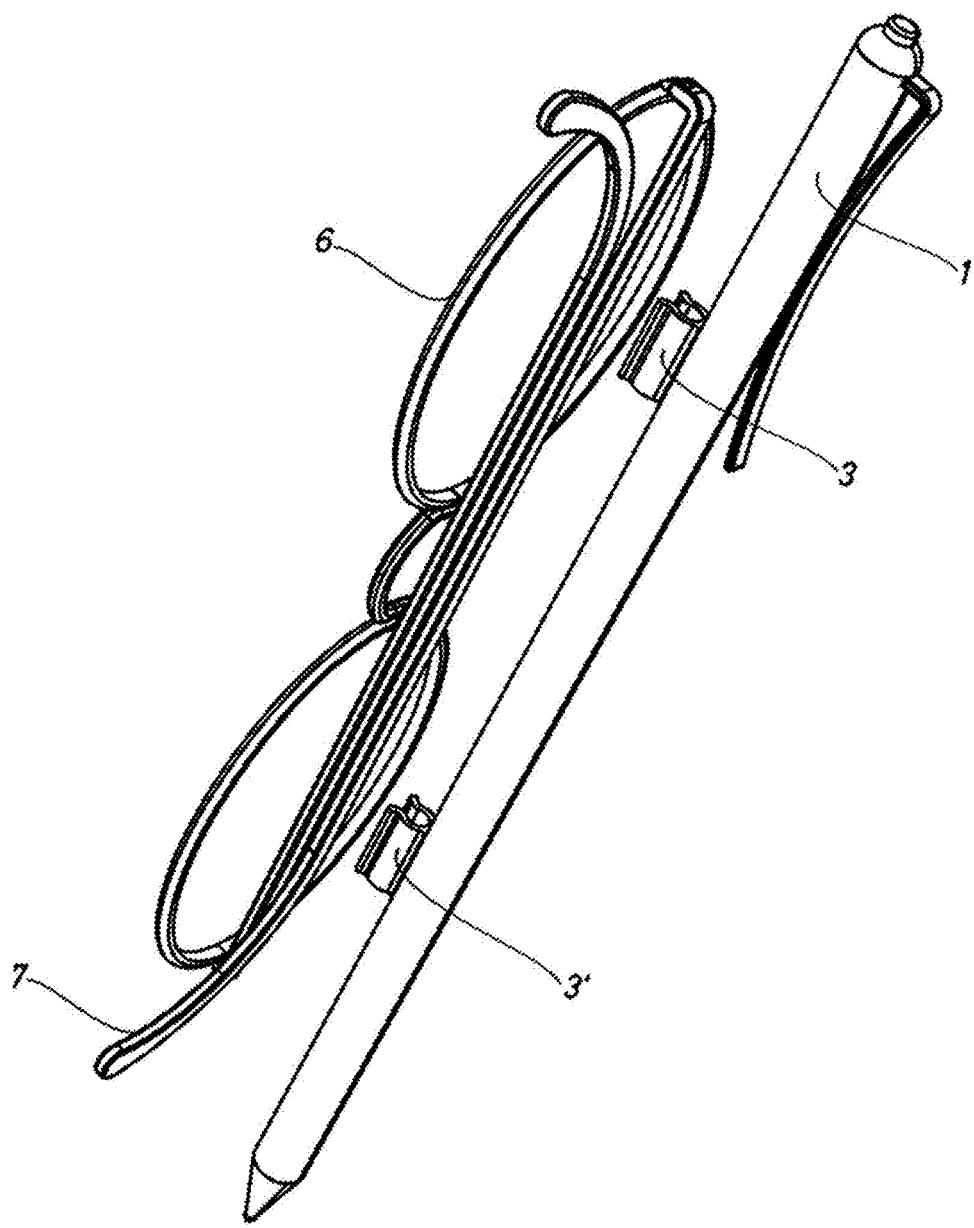
FIG. 2 shows a perspective view of a possible embodiment of the device for attaching glasses of the present invention together with glasses in the appropriate position for being attached in said device.

As shown in FIG. 2, for attaching the glasses -6- to the elongate element -1- when the means for attaching the same are two rings -3-, -3'-, said glasses have to be positioned with one of their temples -7- in a position parallel to said clamps.

Figure 3:
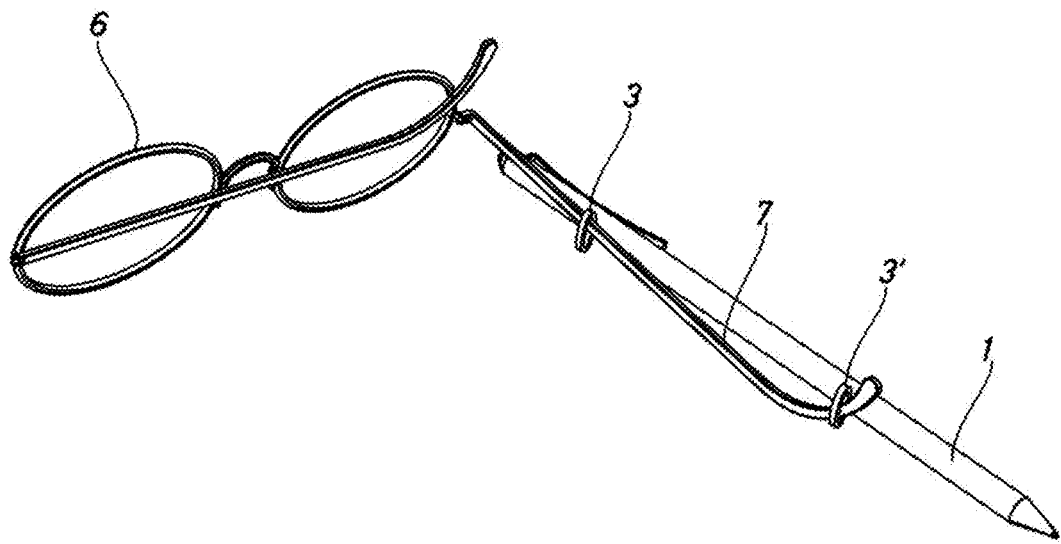
FIG. 3 shows a perspective view of a possible embodiment of the device for attaching glasses of the present invention, in which a temple of the glasses has been inserted into the rings acting as attachment elements.

FIG. 3 shows the attachment of the glasses -6- to the elongate element -1- when the means for attaching the same are two rings -3-, -3'-. In this embodiment of the invention the temple of the glasses -7- is inserted through said rings -3-, -3'-.

Figure 4:
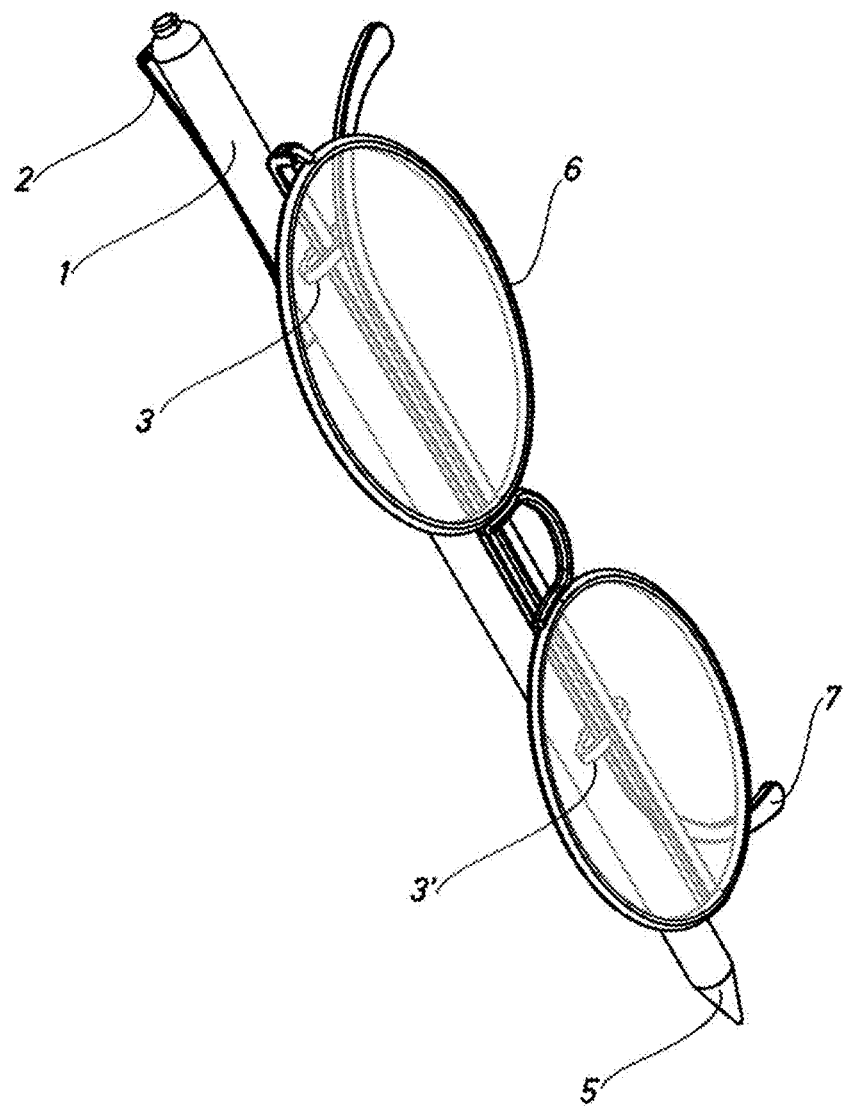
FIG. 4 shows a perspective view of a possible embodiment of the device for attaching glasses of the present invention together with glasses attached by said device by means of rings.
Figure 5:
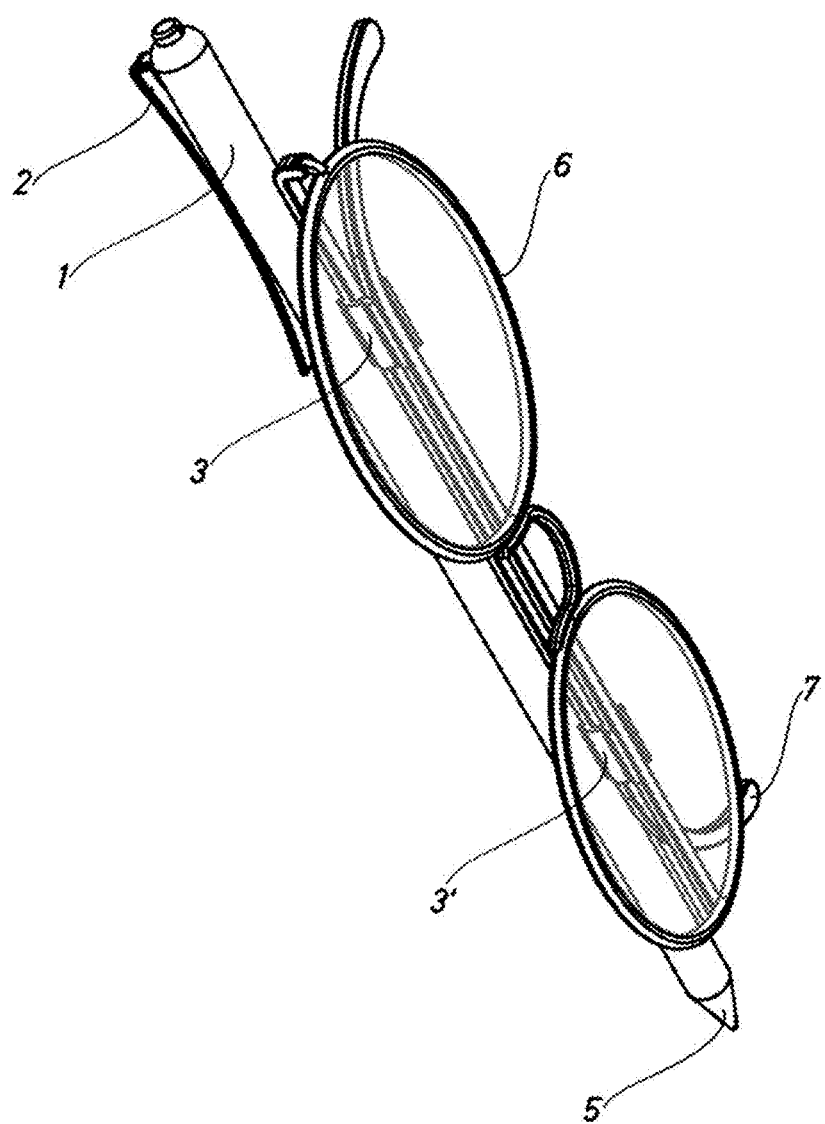
FIG. 5 shows a perspective view of a possible embodiment of the device for attaching glasses of the present invention together with glasses attached by said device by means of clamps.

FIGS. 4 and 5 show the arrangement of glasses -6- when the temple -7- of said glasses is fastened to the elongate element -1- through the attachment elements -3-, -3'-, whether these are two rings -FIG. 4- or two clamps -FIG. 5-.

Figure 6:
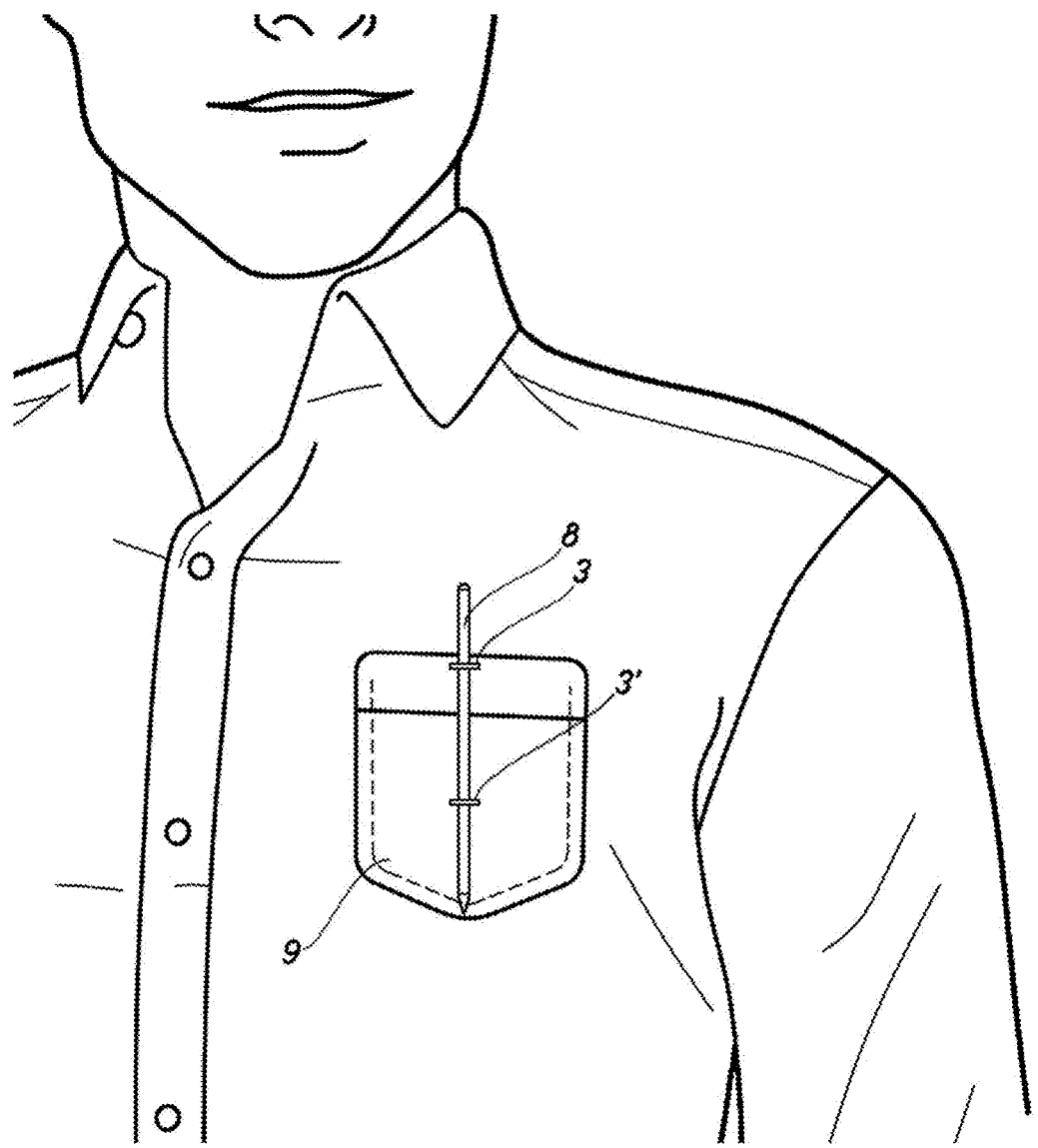
FIG. 6 shows a perspective view of a possible embodiment of the device for attaching glasses of the present invention, with rings as a means of attachment, fastened to the shirt pocket of a user.
Figure 7:
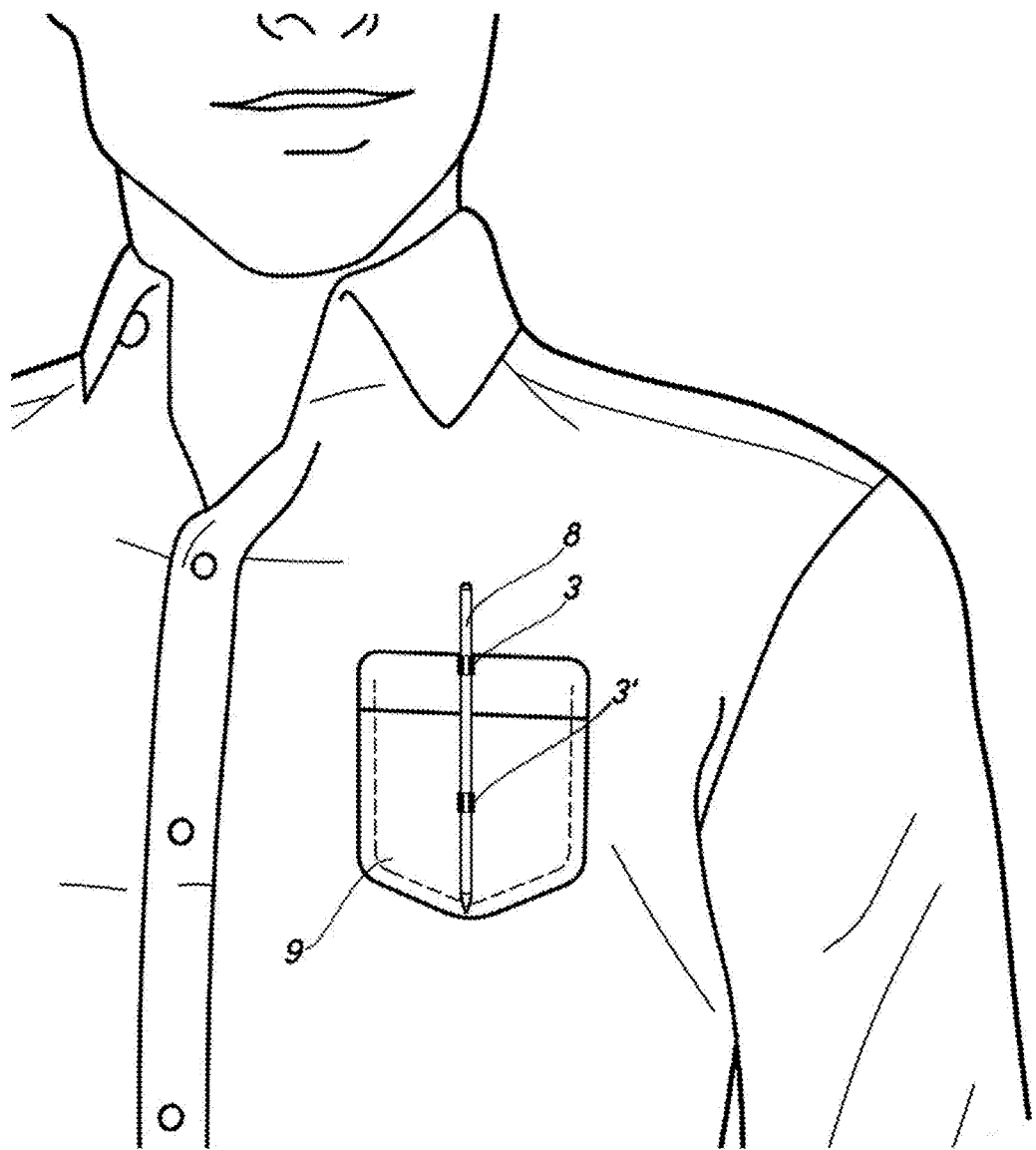
FIG. 7 shows a perspective view of a possible embodiment of the device for attaching glasses of the present invention, with clamps as a means of attachment, fastened to the shirt pocket of a user.

FIGS. 6 and 7 show the arrangement of the device -8- when it is fastened to a shirt pocket -9-. The glasses attachment means -3-, -3'- face out from the pocket, whether they are two rings -FIG. 6- or two clamps -FIG. 7-.

Figure 8:
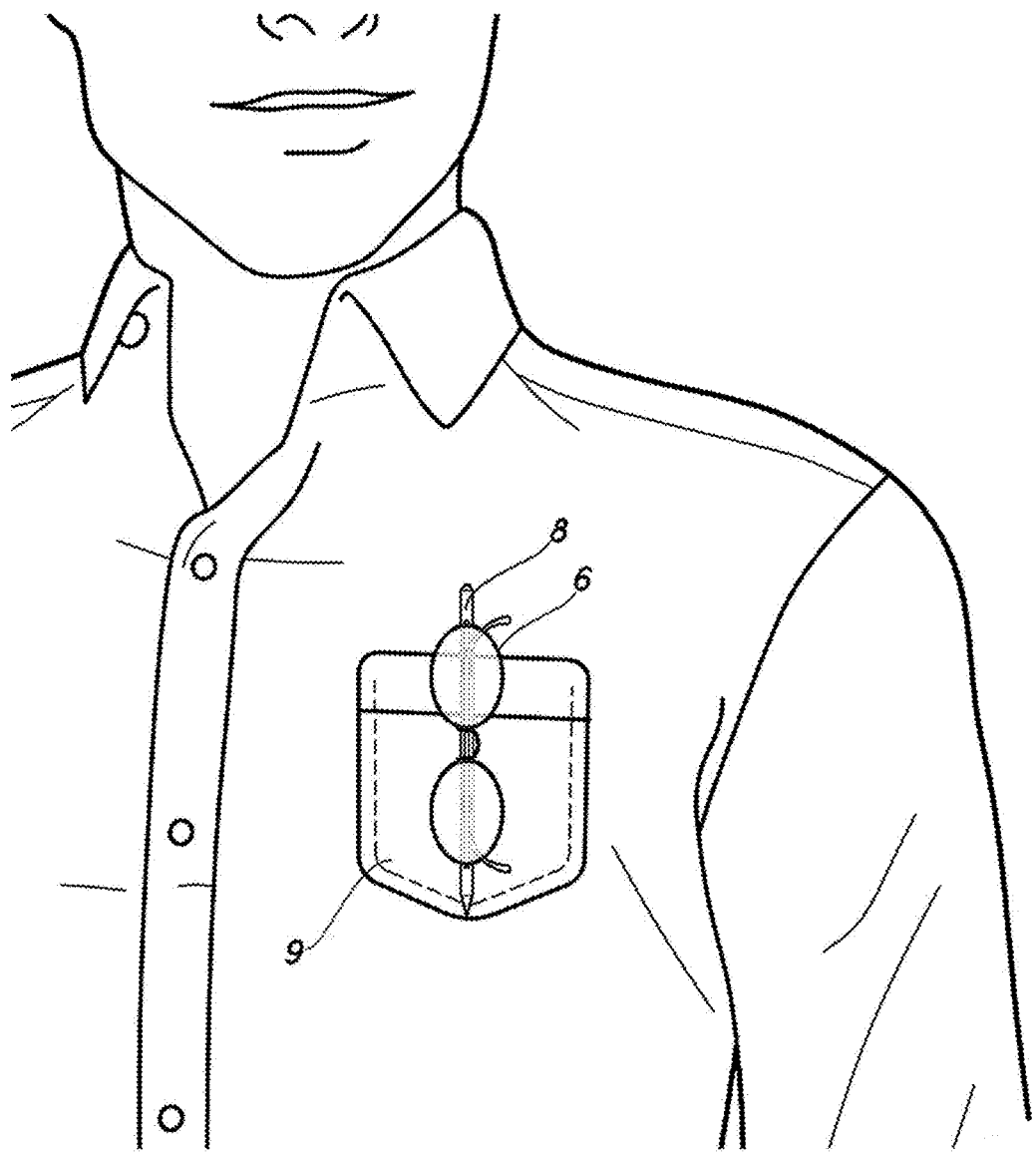
FIG. 8 shows a perspective view of a possible embodiment of the device for attaching glasses of the present invention, with glasses attached to said device and where said device is fastened to the shirt pocket of a user.

FIG. 8 shows the arrangement of some glasses -6- attached to the device -8- of the present invention when it is fastened to a shirt pocket -9-.

Although the invention has been described in relation to preferred exemplary embodiments, these should not be considered to restrict the invention, which is to be defined by the broadest interpretation of the following claims.

The invention claimed is:

1. A device for attaching glasses, the device comprising:
an elongate element comprising a writing instrument having a main body portion extending along a length of the elongate element, the main body portion having a first end and a second end;
a clip proximate the first end of the main body portion configured for fastening to garments, the clip having a retainer portion extending longitudinally along the main body portion of the elongate element; and
at least a first temple attachment element and a second temple attachment element fixed directly to the main body portion of the elongate element and extending radially outward from only a first side of the main body portion of the elongate element, the at least the first temple attachment element and the second temple attachment element being longitudinally aligned along the main body portion of the elongate element and configured for directly engaging and attaching a glasses temple;
wherein the clip is aligned radially apart from the at least the first temple attachment element and the second temple attachment element and wherein the first temple attachment element is nearer the first end of the main body portion and spaced from the first end of the main body portion a same distance as a distance of the retainer portion from the first end, and wherein the second temple attachment element is nearer the second end of the main body portion than the first end of the main body portion.

2. The device according to claim 1 wherein said clip comprises a clip-type clamp.

3. The device according to claim 1, wherein said temple attachment elements comprise rings having longitudinally aligned apertures configured so that a glasses temple is insertable through the apertures of the rings and retained by the rings.

4. The device according to claim 3, wherein the rings comprise at least two spaced apart rings with the apertures longitudinally aligned.

5. The device according to claim 1, wherein said temple attachment elements comprise clamps configured so that a glasses temple is insertable into the clamps by pressure.

6. The device according to claim 5, wherein the clamps comprise opposed gripping elements, each of the clamps defining a gap intermediate the gripping elements, the gap opening radially outward and receiving a glasses temple; and wherein the gaps are longitudinally aligned.

7. The device according to claim 1, wherein said temple attachment elements are fastened by pressure to the main body portion of the elongate element through holes located on a surface of the main body portion of said elongate element.

8. The device according to claim 1, wherein the at least the first temple attachment and the second temple attachment element are spaced apart by more than one half of the length of the main body portion of the elongate element.

* * * * *